United States Patent [19]

D'Aluisio

[11] Patent Number: 5,099,958
[45] Date of Patent: Mar. 31, 1992

[54] CALIPER BRAKE FOR A BICYCLE

[75] Inventor: Christopher D'Aluisio, West Redding, Conn.

[73] Assignee: Cannondale Corporation, Georgetown, Conn.

[21] Appl. No.: 561,676

[22] Filed: Aug. 1, 1990

[51] Int. Cl.⁵ .............................................. B62L 3/02
[52] U.S. Cl. .............................. 188/24.22; 188/24.12
[58] Field of Search ................. 188/20, 24.12, 24.15, 188/24.21, 24.22, 25, 24.11

[56] References Cited

U.S. PATENT DOCUMENTS

| 4,027,746 | 6/1977 | Kine . | |
|---|---|---|---|
| 4,290,507 | 9/1981 | Brown | 188/24.15 |
| 4,546,858 | 10/1985 | Nagano | 188/24.19 |
| 4,754,853 | 7/1988 | Nagano | 188/24.19 |
| 4,766,979 | 8/1988 | Nagano | 188/24.12 |
| 4,850,456 | 7/1989 | Chi | 188/24.21 X |

FOREIGN PATENT DOCUMENTS

| 3709804 | 10/1988 | Fed. Rep. of Germany . | |
|---|---|---|---|
| 0521530 | 7/1921 | France | 188/24.12 |
| 893772 | 10/1944 | France . | |
| 902657 | 9/1945 | France . | |
| 919492 | 3/1947 | France . | |
| 0255861 | 2/1949 | France | 188/24.12 |
| 963949 | 7/1950 | France . | |
| 0441101 | 1/1936 | United Kingdom | 188/24.12 |

Primary Examiner—Matthew C. Graham
Assistant Examiner—Peter M. Poon
Attorney, Agent, or Firm—Brumbaugh, Graves, Donohue & Raymond

[57] ABSTRACT

A caliper brake for a bicycle comprises a pair of pivot mounts, one of which is mounted on a bicycle member laterally of a wheel rim, one on either side of the wheel. A brake arm is pivotally mounted in cantilevered relation on each pivot mount adjacent its lower end, is biassed away from the wheel rim, and carries a brake shoe intermediate its ends. A guide is affixed to a member of the bicycle above the wheel. A brake lever cable is connected directly to the upper end of one brake arm. A sheath of the brake lever cable terminates in spaced-apart relation to the upper end of the one brake arm to which the cable is attached and has its end received in a holder. A yoke cable is affixed to the upper end of the other brake arm, passes partway around the guide and is affixed to the sheath holder.

1 Claim, 2 Drawing Sheets ic brakes in which the brake lever cable force is transmitted substantially undiminished to the brake arms. Another object is to keep the size and weight of the brakes at a minimum. Also, it is desired that the structure and assembly of the brakes be simple and economical.

CALIPER BRAKE FOR A BICYCLE

BACKGROUND OF THE INVENTION

Although a great many specific designs for bicycle brakes have been proposed and commercialized, most of them fall into one or the other of two categories, center pull and side pull. In center pull type brakes the brake arms are connected to each other by a cable, and the brake lever cable is connected to the center of the connecting cable and directly pivots the brake arms by transmitting the force applied to the lever cable to the connecting cable. U.S. Pat. Nos. 4,754,853 (Nagano, July 5, 1988) and 4,546,858 (Nagano, Oct. 15, 1985) describe and show typical designs for center pull brakes. In the Nagano designs the brake arms are pivotally mounted in cantilevered relation at their lower ends. In a variation of a center pull type brake, as shown, for example in U.S. Pat. No. 4,027,746 (Kine, June 7, 1977), L-shaped brake arms are pivotally mounted intermediate their ends on a bracket. Kine also shows the modification of having a connecting arm rather than a cable.

An inherent characteristic of center pull brakes is that the force applied to each brake arm is less that the force applied to the brake lever cable; the lever cable force is transmitted to the two brake arms along a path that is at an angle to the lever cable, so the applied force is the resultant force at the angle formed between the brake cable and the connecting cable (or its equivalent) of one-half of the brake lever cable force. For example if each branch of the connecting cable forms an angle of 45 degrees with the lever cable, the force in the connecting cable is 0.707 times the lever cable force.

Side-pull type brakes make use of the foreshortening of the distance between the end of a sheath around the brake lever cable and the end of the lever cable and the reaction force established in the sheath in response to the lever cable force. One brake lever is directly connected to the lever cable, and the other brake lever is connected to the lever cable sheath. Accordingly, both brake arms are subject the full force applied to the brake cable, the force on one arm being the direct force of the lever cable and the force on the other arm being the reaction force acting on the sheath. The advantage of side-pull brakes is that the full force of the brake lever cable is applied to both brake arms. The disadvantage is that the brake arms are relatively large and add weight to the bicycle. Various designs of side-pull brakes are found in U.S Pat. No. 4,766,979 (Nagano, Aug. 31, 1988), French Pat. No. 893,772 (Simon, 1944), French Pat. No. 902,657 (Pecquois, 1945), French Pat. No. 919,492 (Finley, 1947), French Pat. No. 963,949 (Sejalon, 1950) and German Published Pat. Appln. No. 37 09 804 (Schmid, 1988).

SUMMARY OF THE INVENTION

An object of the present invention is to provide bicycle brakes in which the brake lever cable force is transmitted substantially undiminished to the brake arms. Another object is to keep the size and weight of the brakes at a minimum. Also, it is desired that the structure and assembly of the brakes be simple and economical.

The foregoing and other objects are attained, in accordance with the present invention, by caliper brakes for a bicycle comprising a pair of pivot mounts, each of which is adapted to be mounted on a bicycle member laterally of and below a wheel rim, one on either side of the wheel. A brake arm is pivotally mounted in cantilevered relation on each pivot mount adjacent its lower end and is biassed away from the wheel rim. A brake shoe is affixed to each brake arm intermediate the ends. A roller is affixed to a member of the bicycle above the wheel. A brake lever cable is connected directly to the upper end of one brake arm, and a sheath of the brake lever cable terminates in spaced-apart relation to the upper end of said one brake arm and has its end received in a holder. A yoke cable is affixed to the upper end of the other brake arm, passes partway around the roller and is affixed to the sheath holder.

In brakes embodying the invention the force of the brake lever cable is applied directly to the brake arm to which it is directly connected. When that brake lever engages the wheel rim and can no longer move, the force in the lever cable tending to reduce the length of the part of the cable between the sheath holder at the brake lever end and the point of attachment of the cable to the lever arm causes the cable sheath to deflect. Because the sheath is essentially incompressible, it exerts a reaction force equal and opposite to the force in the lever cable, and its displacement is reflected as a movement of the sheath holder at the brake arm end toward the brake arm to which the lever cable is attached, and away from the roller. The movement of the sheath holder pulls the yoke cable around the roller and pivots the brake arm to which it is attached into engagement with the wheel rim. Thus the lever cable force is applied directly to the brake arm to which it is attached, and the reaction force is applied to the brake arm to which the yoke cable is attached. The lever arms can be kept small and light in weight; the yoke cable and roller are small and light as compared to the portions of brake arms in previously known side-pull brakes required to enable the sheath to act on one arm and the cable on the other. The size and weight advantage of center pull brakes is attained, while the advantage of applying an undiminished force to the brakes found in side pull brakes is also , enjoyed.

For a better understanding of the invention, reference may be made the following description of an exemplary embodiment, taken in conjunction with the figures of the accompanying drawings.

DESCRIPTION OF THE EMBODIMENT

Figure 1:
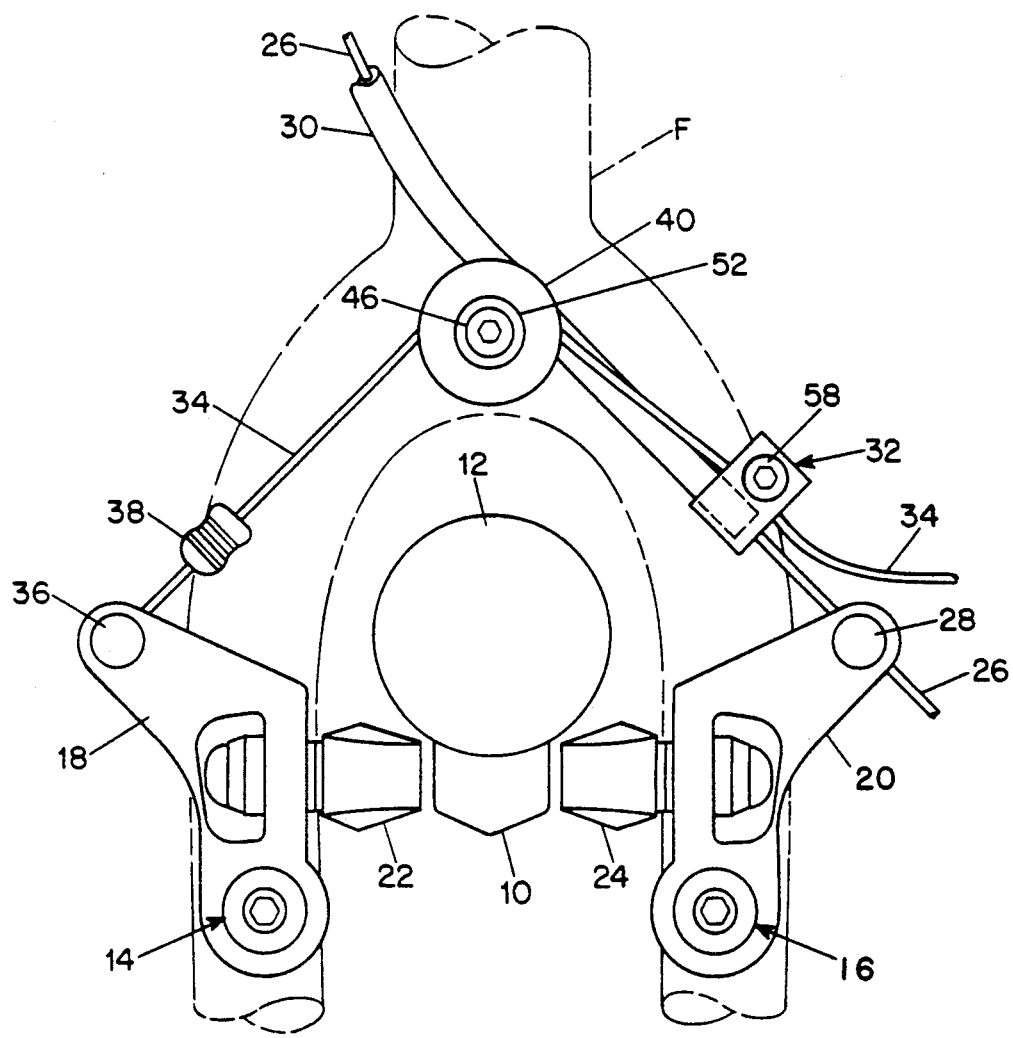
FIG. 1 is an elevational view of the embodiment.

The phantom lines in FIG. 1 depict the front fork F of a bicycle. Affixed to each leg of the fork at a location below in elevation the rim 10 of the bicycle front wheel 12 is a pivot mount 14, 16 for a corresponding brake arm 18, 20. As is well-known per se, and as need not, therefore, be shown in detail, each brake arm is pivotally mounted in cantilevered relation on the mount and is biassed by a helical torsion spring in a direction away from the wheel rim, so that the brake shoes 22,24 affixed to the respective arms do not engage the wheel rim in the absence of a displacement of a brake lever cable 26.

An example of a pivot mounting arrangement may be found in the Nagano '853 patent referred to above. The brake lever cable 26 is affixed directly to a fixture 28 at the upper end of the brake arm 20. The end of the sheath 30 of the brake lever cable is located proximate to, but in spaced relation to, the brake arm 20 and is received in a sheath holder 32. One end of a yoke cable 34 is looped through a fixture 36 on the upper end of the brake arm 18, fastened to itself by a crimped fitting 38, is wrapped part way around a roller 40 and is fastened at its other end to the sheath holder 32.

Figure 2:
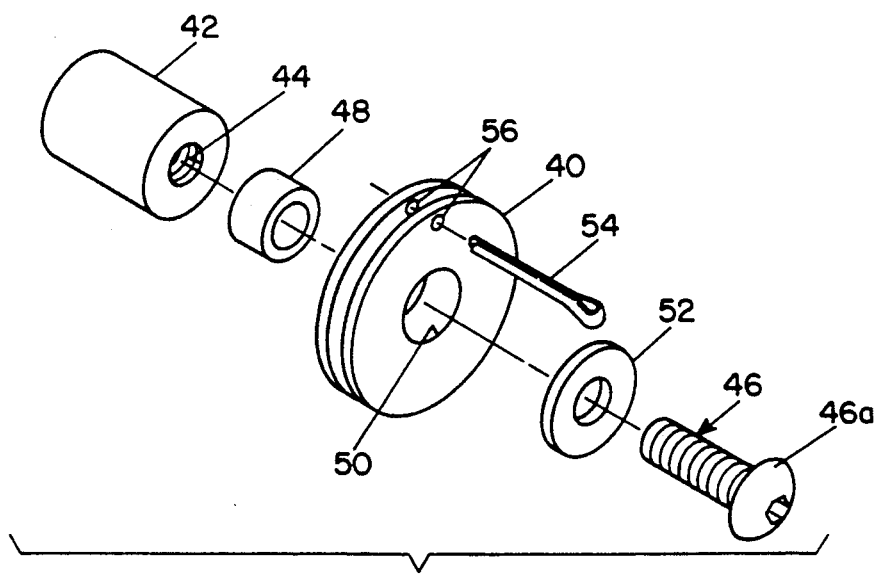
FIG. 2 is an exploded pictorial view of the roller and its mounting components.

Referring to FIG. 2, the roller 40 is rotatably mounted on a stud 42 that is welded or otherwise suitably affixed to the head tube of the bicycle above the wheel (see FIG. 1). A threaded hole 44 in the stud 42 receives a button head cap screw 46 that passes through a bushing 48 interposed between the screw and a hole 50 in the roller. A washer 52 is located between the head 46a of the screw 46 and the roller 40. A cotter pin 54 received through holes 56 near the perimeter of the roller 40 ensures that the yoke cable will not jump out of the roller groove.

Figure 4:
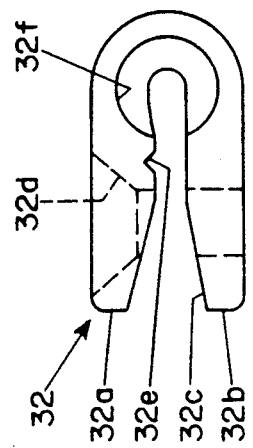
FIG. 4 is an end view of the sheath holder.
Figure 5:
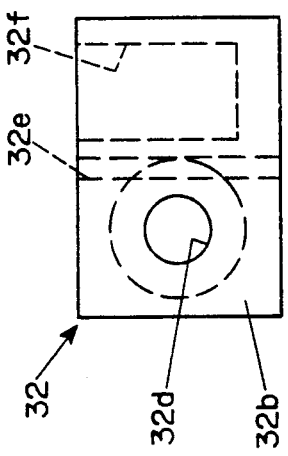
FIG. 5 is a side view of the sheath holder.
Figure 3:
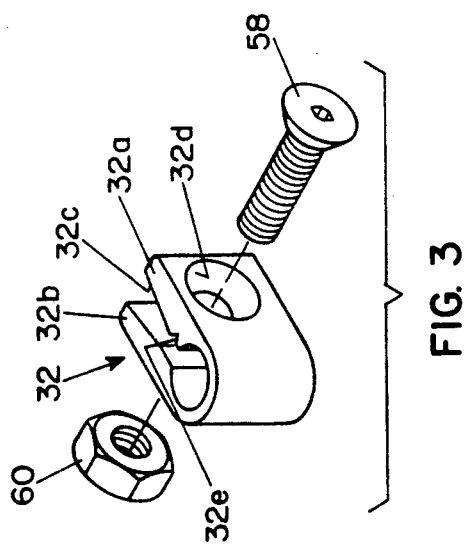
FIG. 3 is an exploded pictorial view of the sheath holder.

The sheath holder 32, which is shown in detail in FIGS. 3 to 5, is a piece cut from an aluminum extrusion having the cross-sectional shape shown in FIG. 4 and cut to the length shown in FIG. 5. The cross-section resembles that of a clothespin, in that it is U-shaped with legs 32a, 32b separated by a slot 32c. A countersunk hole 32d transects the legs near their free ends. On the inside of one leg 32a is a shallow V groove 32e. A bore 32f partway into one face near the loop end of the holder 32 forms a socket in which the end of the lever cable sheath 30 is received. After positioning the holder 32 over the brake lever cable and fitting the sheath into the socket 32f, the yoke cable is moved into place in the V groove 32e. The two legs 32a and 32b of the holder are pulled together to clamp the holder to the yoke cable 34 and firmly retain it by a screw 58 and a nut 60.

Tension applied by the brake lever to the lever cable foreshortens the distance between the fixture 28 on the brake arm 20 and the sheath holder 32. The sheath 30 displaces to accommodate itself to the reduction in length of the lever cable between the fixture 28 and the sheath holder at the brake lever. The force in the cable is applied directly to the brake arm 20, and the reaction force of the sheath pulls the yoke cable 34 around the roller 40, thereby pivoting the brake arm 18 toward and into engagement with the wheel rim.

The embodiment is shown and described above in conjunction the a front wheel brake. The invention can also be applied to a rear wheel brake, in which case the pivot mounts for the brake arms are installed on the seat stays and the roller on a bridge spanning the seat stays above the rear wheel. The particular design of the roller, the roller mount, and the sheath holder are, of course, subject to many variations and modifications.

I claim:

1. A caliper brake for a bicycle comprising a pair of pivot mounts, each of which is mounted on a bicycle member laterally of a wheel rim, one on either side of the wheel, a brake arm pivotally mounted in cantilevered relation on each pivot mount adjacent its lower end and biassed away from the wheel rim, a brake shoe affixed to each brake arm intermediate the ends, a guide affixed to a member of the bicycle above the wheel, a brake lever cable connected directly to the upper end of one brake arm, a sheath of the brake lever cable terminating in spaced-apart relation to the upper end of said one brake arm and having its end received in a holder, and a yoke cable affixed to the upper end of the other brake arm, passed partway around the guide and affixed to the sheath holder.

* * * * *